Figure 1:
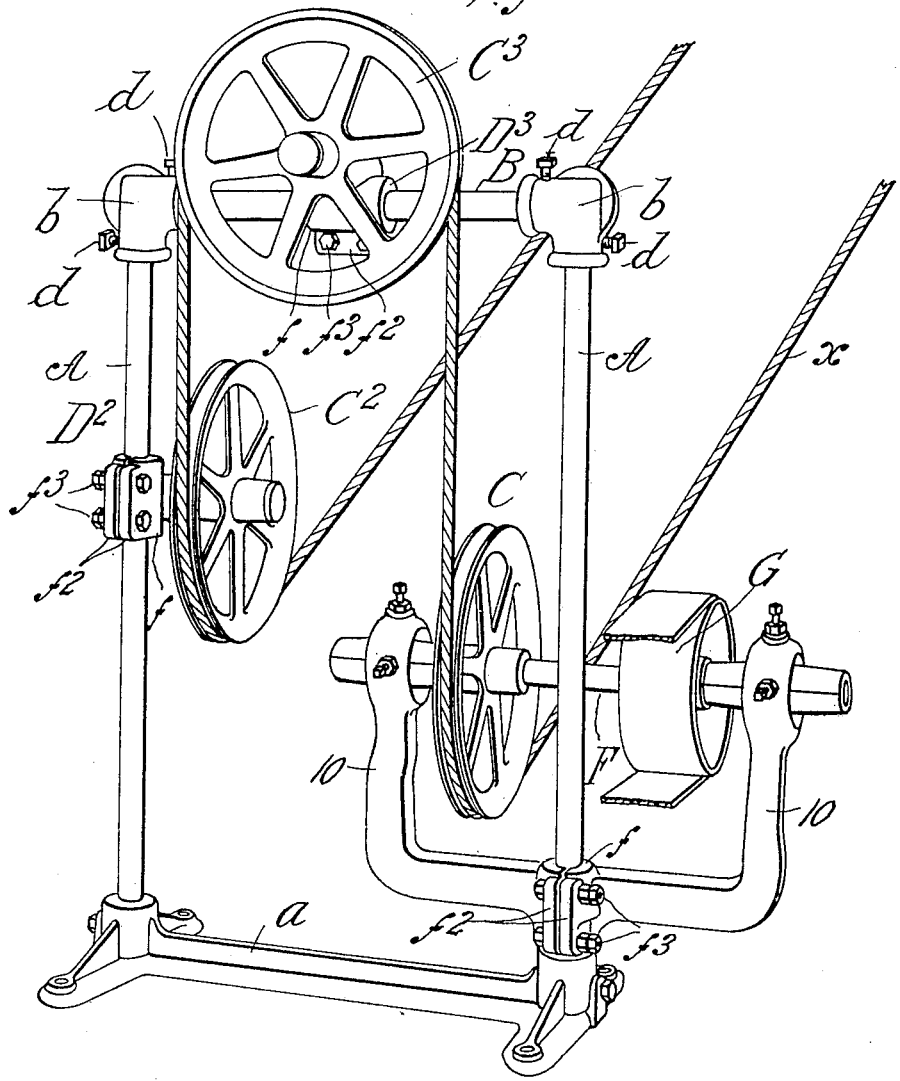

J. O. STANLEY.
POWER TRANSMISSION DEVICE.
APPLICATION FILED AUG. 21, 1908.

906,467.

Patented Dec. 8, 1908.
3 SHEETS—SHEET 1.

WITNESSES:
H. L. Sprague
G. R. Driscoll

INVENTOR,
John O. Stanley,
BY
ATTORNEY.

J. O. STANLEY.
POWER TRANSMISSION DEVICE.
APPLICATION FILED AUG. 21, 1908.
906,467.
Patented Dec. 8, 1908.
3 SHEETS—SHEET 2.
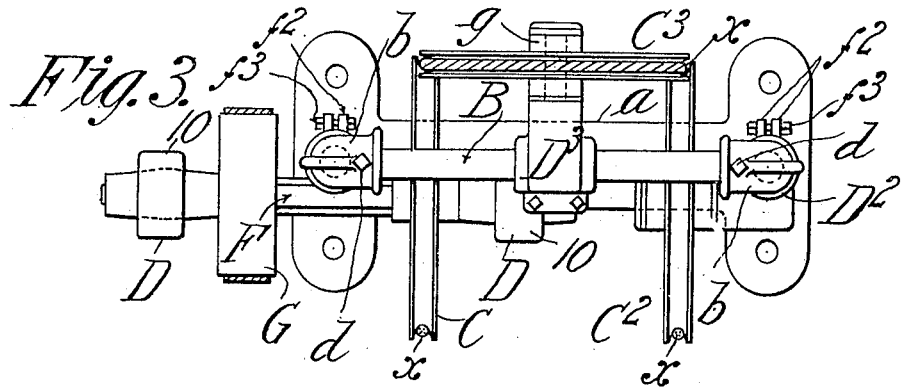
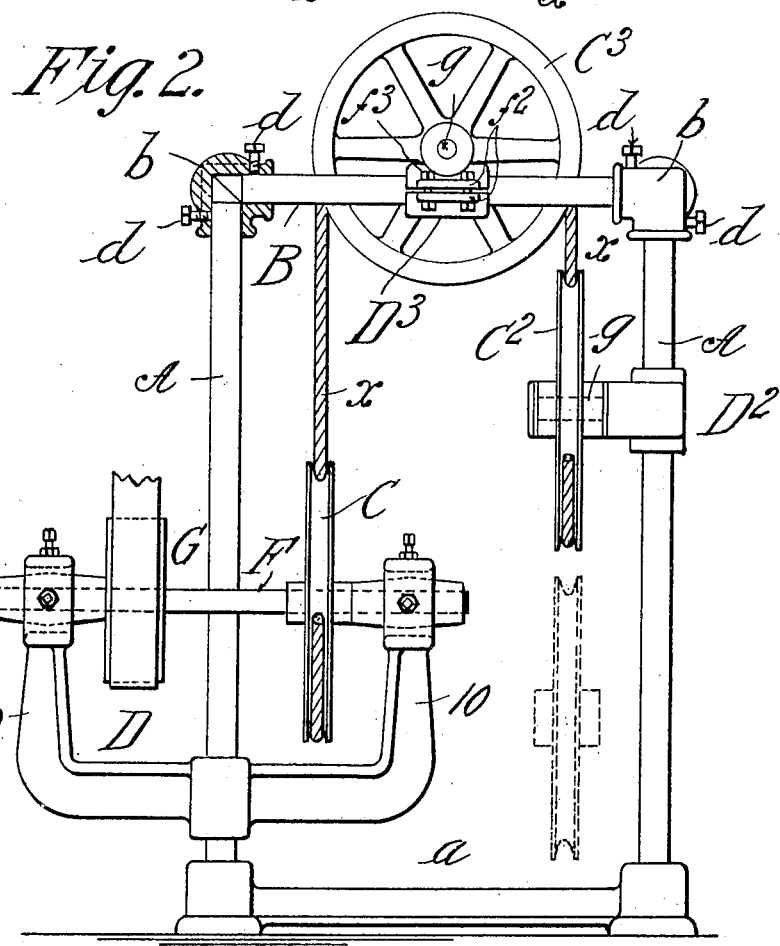
WITNESSES:
H. L. Sprague
G. R. Driscoll
INVENTOR,
John O. Stanley,
BY
ATTORNEY.

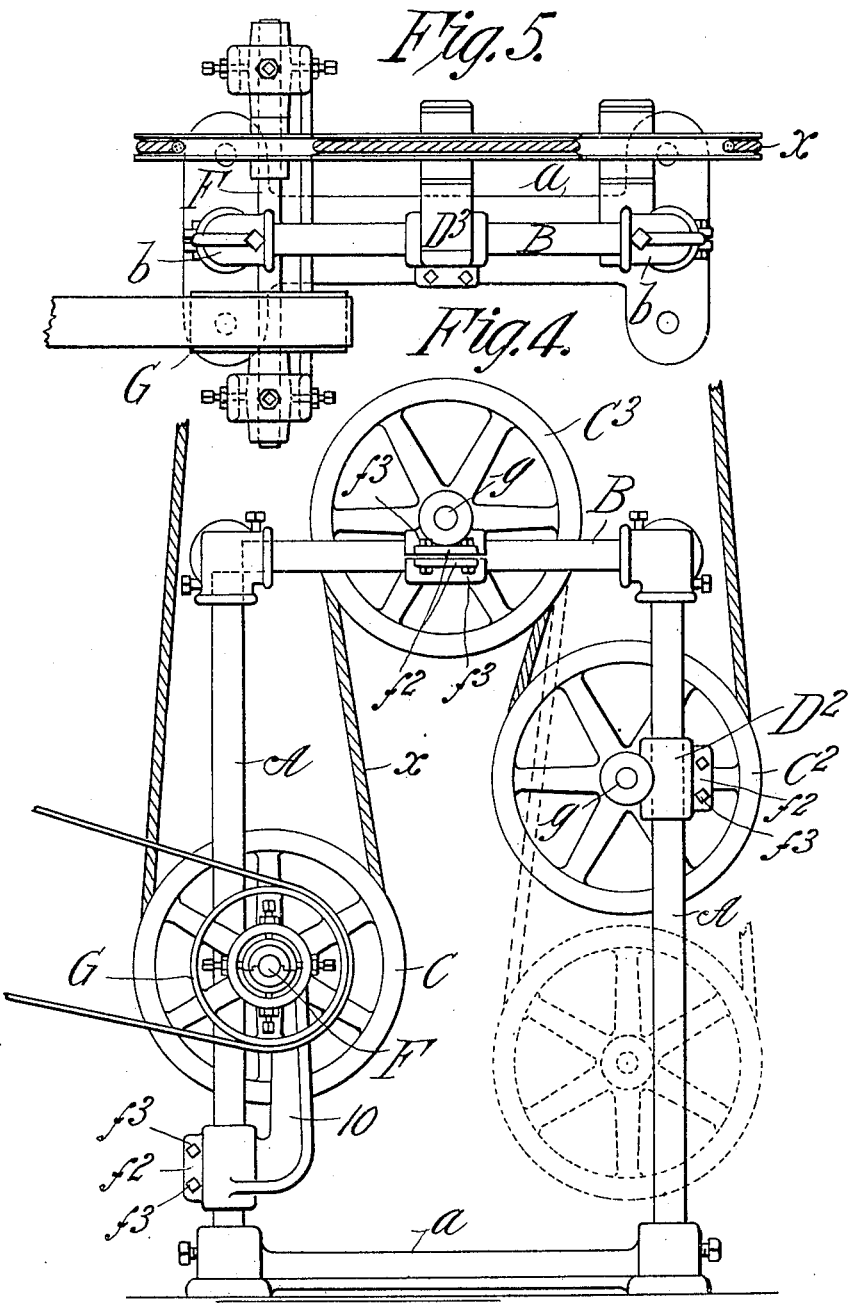

UNITED STATES PATENT OFFICE.

JOHN O. STANLEY, OF SOUTH HADLEY FALLS, MASSACHUSETTS, ASSIGNOR TO B. F. PERKINS AND SON, INCORPORATED, OF HOLYOKE, MASSACHUSETTS, A CORPORATION OF MASSACHUSETTS.

POWER-TRANSMISSION DEVICE.

No. 906,467.  Specification of Letters Patent.  Patented Dec. 8, 1908.

Application filed August 21, 1908. Serial No. 449,677.

*To all whom it may concern:*

Be it known that I, JOHN O. STANLEY, a citizen of the United States of America, and resident of South Hadley Falls, in the county of Hampshire and State of Massachusetts, have invented certain new and useful Improvements in Power-Transmission Devices, of which the following is a full, clear, and exact description.

This invention relates to a fixture or appliance for use in a great variety of situations for light duty power transmission through the medium of a cord, rope or cable, and the contrivance serves both as a countershaft and as a binder or take-up for the cable driven by the device, and in turn driving other machinery, such, for instance, as a fan or blower or series thereof.

The invention consists in the combination of parts and the construction of certain of the parts with a view to acquiring interchanges, adjustments and relative relations of such parts whereby the device may be rendered available for driving under many conditions although there may be a great variety as to the location of the source of driving power relatively to the fans or machines to be driven.

The transmission device is illustrated in the accompanying drawings in which:—

Figure 1 is a perspective view; Fig. 2 is a side elevation; Fig. 3 is a plan view; Figs. 4 and 5 are side elevation and plan views to show one of the many different arrangements of parts of which the device is susceptible.

The device comprises a frame which includes opposite parallel vertical bars A A, a base or foot piece $a$, extending between and connecting the lower ends of such bars and a cross bar B uniting the upper ends of the vertical bars. The supporting connection between the bars A A and the transverse bar B is by means of a pair of L-shaped connection pieces $b$ having sockets in their right angularly disposed members in which the adjacent right angularly disposed ends of the three bars are closely though removably fitted,—the confinement of the parts in their coupled relation being attained by the set screws $d$ $d$.

C, $C^2$ and $C^3$ represent three sheaves having grooved rims and supported by brackets D, $D^2$ and $D^3$ respectively therefor.

All of the bars A, A, and B are cylindrical and of uniform diameter, and the three sheave carrying brackets comprise split collars $f$ with the cylindrical openings therethrough all of the same size, the corresponding sized frame bars and the split collars have a well-known form of means for constricting them consisting of ear lugs $f^2$ and binding screws or bolts $f^3$.

One of the brackets D is constructed of yoke or U-form, the opposite members 10, 10, thereof standing in a plane offset somewhat from the line of its split collar so that its extremities will be offside from whichever one of the frame bars such bracket is adjustably clamped to.

F represents a shaft journaled in the opposite arms 10, 10, of the bracket D having a driving pulley G affixed thereon and the one, C of the sheaves is also affixed on the shaft F. This shaft F may be considered as a countershaft being rotatively driven by a belt from any power shaft. The other two clamping brackets $D^2$ and $D^3$ have studs $g$ extending at right angles to the circular hole within each bracket body or collar on which studs the sheaves $C^2$ and $C^3$ are rotatably supported.

$x$ represents a driving cable or rope, bights of which have engagements around the several sheaves, acquire running motion from a positively driven sheave C on the countershaft while the straight courses of the cable run to and return from engagement around a pulley or drive wheel on the shaft of a fan or machine at a near or remote location and which is to be driven through the medium of this transmission device.

All of the sheaves and their carrying brackets are adjustable longitudinally along the bars with which they are combined; and all of the sheaves and their brackets, moreover, are revolubly adjustable,—the vertical adjustments of one or more of the sheaves being effectual for cable take-up or tensioning purposes while the revoluble adjustments make it entirely convenient to acquire a guidance of the driving cable in any one of many directions with relation to the axis of the countershaft F.

The drawings, Figs. 1, 2 and 3, represent the countershaft bracket on one of the vertical frame bars A and the driving cable as having its courses running more or less nearly horizontally and at right angles to the general plane of the frame. In these views the sheaves C and C² are shown with their horizontal axes at right angles to the horizontal axis of the sheave C³.

Figs. 4 and 5 represent the sheave C and C² revolubly swung with their brackets to be in a plane coincident with that of the sheave C³ and behind, or in front of, and parallel with the general plane of the frame so that the driving cable instead of running transversely away from the fixture will run in a plane alongside of the latter.

In the foregoing description the terms "vertical" "horizontal", etc., are merely relatively used, and their employment is not to be regarded as absolute because this device instead of being used as a stand fixture supported by and rising above the floor, may be employed inverted as a hanger and it may be employed horizontally as a wall bracket extending squarely forwardly from the wall, or obliquely as sometimes desirable when having a corner location.

There are situations in which this device may be advantageously employed wherein it is desirable that the countershaft bracket D be mounted on the transverse bar B of the frame, usually with the shaft F, driving pulley G, and sheave C axially vertical, and with the sheave in a horizontal plane below the bar B; and it is entirely practicable to secure interchanged positions of the brackets D and D³, and this may be done by loosening the set screws d for the connection pieces b, lifting the bar and the connection pieces off from the tops of the upright bars, removing one of the connection pieces from the bar B, and sliding off the brackets D and D³ and reversing their relations after which the cross bar B is united by the corner connections b b to the vertical bars as before.

While I have shown and described, or mentioned various manners of adjustments and relations of the parts of the device to render the latter available under different conditions, the device is susceptible of still further arrangements and adjustments which may be found desirable and manifest to the owner of the fixture.

I claim:—

1. The combination with a frame comprising opposite parallel bars, a foot plate from which each of said opposite bars extend, and a cross bar uniting the opposite bars, at points remote from the foot plate, of three sheaves, and brackets in which they are respectively supported, having clamping devices for confining them severally and adjustably on the several bars, one of said sheaves being mounted on a shaft journaled in the bracket therefor, and a driving pulley on the shaft.

2. The combination with a frame comprising opposite parallel bars, a foot plate from which each of said opposite bars extend, and a cross bar uniting the opposite bars, at points remote from the foot plate, of three sheaves, and brackets in which they are respectively supported, having clamping devices for confining them severally and adjustably on the several bars, one of said sheaves being mounted on a shaft journaled in the bracket therefor, a driving pulley on the shaft, and a driving cable, bights of which are engaged around each of the sheaves.

3. The combination with a frame comprising opposite parallel bars, and a cross bar uniting ends of the opposite bars, of three sheaves, and brackets in which they are respectively supported, having means for confining them severally on the several bars, the confining means for at least one of the sheave carrying brackets being capable of permitting a longitudinal adjustment of such bracket on its bar, one of said sheaves being mounted on a shaft journaled in the bracket therefor, and a pulley on the shaft.

4. The combination with a frame comprising opposite parallel bars, and a cross bar uniting the ends of the opposite bars, of three sheaves and brackets in which they are respectively supported, said brackets having clamps for severally embracing the three bars of the frame and said brackets being all revolubly adjustable on the bars on which they engage, at least one of the brackets being longitudinally adjustable, and one of said sheaves being mounted on a shaft and journaled in the bracket therefor, and a pulley on the shaft.

5. The combination with a frame comprising opposite parallel bars, and a cross bar uniting ends of the opposite bars, of three sheaves, and brackets in which they are respectively supported, adjustable on the several bars, one of said sheaves being affixed on a shaft journaled in the bracket for such sheave and a driving pulley on the shaft, and said sheave carrying brackets being adapted to have positions interchanged from their engagements with the frame bars.

6. The combination with a frame comprising opposite parallel bars and a cross bar united to the ends of the opposite bars, all of said bars being cylindrical and of uniform diameter, of three sheaves and brackets on which they are rotatably mounted, each bracket comprising a split collar with the cylindrical openings therethrough, all of the same size to be fitted about corresponding sized frame bars, and having means for constricting the collars, one of said sheaves being mounted on a shaft journaled in the bracket therefor, a driving pulley on the shaft, and a driving cable different portions of which have partial encircling engagements around the several sheaves.

7. The combination with a frame comprising opposite parallel bars and a cross bar uniting ends of the opposite bars, of three sheaves and brackets about which they are respectively supported, having means for embracing and being clamped to the bars and adjustable longitudinally and also revolubly thereon, two of the brackets having studs on which the sheaves appurtenant thereto are revolubly mounted while another one of the brackets is constructed of U-form, having a shaft journaled in the opposite members thereof on which the sheave appurtenant to such bracket is affixed and said shaft having a driving pulley affixed thereon.

8. The combination with a frame comprising opposite parallel bars, a base or foot piece extending between and connecting ends of such bars, socketed L-shaped connection pieces detachably secured on the opposite ends of the parallel bars, and a cross bar for uniting the opposite bars and having the extremities thereof supported and detachably confined in said socketed L-shaped connection pieces, three brackets having means whereby they are clamped adjustably about the several bars, each having a sheave rotatably mounted thereon and means for positively driving one of the sheaves.

Signed by me at Holyoke Mass., in presence of two subscribing witnesses.

JOHN O. STANLEY.

Witnesses:
 WM. H. BOND,
 C. F. HEENS.